United States Patent [19]

Scharrer et al.

[11] 4,447,354
[45] May 8, 1984

[54] METHOD FOR MAKING OXIDATION-STABLE, LIGHT-COLORED GLYCEROL ESTER OF MODIFIED ROSIN

[75] Inventors: Roland P. F. Scharrer, Pelham, N.Y.; Robert W. Schluenz, Panama City, Fla.; Richard H. Kramss, Stamford, Conn.

[73] Assignee: Arizona Chemical Company, Fair Lawn, N.J.

[21] Appl. No.: 477,114

[22] Filed: Mar. 21, 1983

[51] Int. Cl.$^3$ ............................. C09F 1/00; C09F 1/04
[52] U.S. Cl. .................................... 260/106; 260/104; 524/764
[58] Field of Search ................. 260/104, 106; 524/764

[56] References Cited

U.S. PATENT DOCUMENTS

| | | | |
|---|---|---|---|
| 2,340,696 | 2/1944 | Rummelsburg | 260/103 |
| 3,423,389 | 1/1969 | Wheelus | 260/97.5 |
| 3,743,616 | 7/1973 | Kest | 524/764 |
| 3,872,073 | 3/1975 | Thorpe et al. | 260/106 |
| 4,172,070 | 10/1979 | Scharrer et al. | 260/104 |
| 4,248,770 | 2/1981 | Matsuo et al. | 260/104 |

Primary Examiner—H. S. Cockeram
Attorney, Agent, or Firm—Gordon L. Hart

[57] ABSTRACT

Glycerol esters of modified rosin are useful tackifiers in rubber adhesive compositions. Esters made with rosin modified by reducing the abietic acid concentration to 5% or less, will retain tackifying properties for longer periods in storage before use. The esters are prepared by simultaneously disproportionating and esterifying unmodified rosin with glycerol in the presence of p-t-amyl phenol and phosphoric acid, for example.

3 Claims, No Drawings

METHOD FOR MAKING OXIDATION-STABLE, LIGHT-COLORED GLYCEROL ESTER OF MODIFIED ROSIN

The invention relates to improvements in rosin esters useful as tackifiers in synthetic rubber adhesive compositions. More particularly the invention pertains to a glycerol ester of disproportionated rosin having improved oxidation resistance and color stability, and to improvements in the making of such esters and to their use in adhesive compositions.

Glycerol esters of rosin are well known and have been used as tackifiers for adhesives, particularly in adhesive compositions made with styrene-butadiene rubbers. The esters of the present invention differ from known glycerol-rosin esters by the fact that the rosin used to make the ester has been modified by disproportionation to reduce abietic content of the rosin. This improves the rosin ester product with regard to color, color stability, and stability against oxidation. The invention provides a modified rosin ester product having longer shelf-life and improved life as a tackifier when used in adhesive compositions.

A batch process may be used for making the modified rosin ester, in which the rosin is treated to reduce the abietic acid content and esterified, carrying out both steps, either simultaneously or successively, in a single reactor.

In one preferred embodiment of the invention, rosin is first heated to temperature in the range from 200° to 300° C. in presence of a disproportionating agent, which also has bleaching action, for time sufficient to reduce the abietic acid content of the rosin to about 10% or less and preferably 2% or less. This art has previously been described in U.S. Pat. No. 3,377,334. A preferred disproportionating agent for this purpose is a mixture of polysulfides of p-t-amylphenol which is available commercially under the tradename Vultac 2. Other suitable disproportionating agents that can be used instead include mono- and poly-sulfides of β-napthol and others listed in U.S. Pat. No. 3,377,344. The modified rosin is then cooled to a lower temperature in the range from 200° to 285° C. and mixed with glycerine and catalyst in amounts needed to esterify the rosin. The esterification is carried out until the acid value is about 10 with vacuum stripping and steam stripping applied as needed to purify the modified rosin ester product.

In an especially preferred embodiment, the disproportionation and esterification are carried out as a single step, as will be described in more detail in the examples below.

EXAMPLE 1

1000 G of tall oil rosin (3.08 moles; Acid Number 172; equivalent weight 325) and 5.0 g of Vultac 2 disproportionating agent is charged into a 4-neck round bottom flask fitted with a paddle stirrer, a thermometer and a steam-jacketed condenser. No pretreatment to purify the rosin is necessary. The contents of the flask are heated with stirring under nitrogen. When the temperature has reached 170° C., 122 g of glycerol (1.33 moles; 4.0 equivalents) is added and the heating continued until the temperature reaches 260° C., where it is maintained for the duration of the reaction. A steam-jacketed condenser permits removal of water through the condenser while returning condensed glycerol to the reactor during the reaction. Additional charges of Vultac 2 disporportionating agent are added at 4.0 hours and 8.0 hours reaction time, each charge in the amount of 1.0 g. Acid number (AN) is monitored and when it has been reduced to about 10, volatile components are stripped off and the reaction product is cooled and stored. The reaction product has Acid Number 10, X color and ring and ball softening point of 83° C. Residual abietic acid content is 2.5%. The shelf life and color stability of the product are tested by exposing powdered samples passed through a No. 40 Tyler sieve (equivalent of 35 mesh screen) of the ester product to air at 22° C., 50% RH for a period of several weeks. The weight gain, indicating oxygen takeup, and the color (Gardner 1963) are monitored periodically during the test.

For comparison, a commercial tackifier which is the glycerol ester of unmodified tall oil rosin is subjected to the same test. The test results are tabulated in Table 1. For the color test, each sample is heated for 1 hour at 205° C. under nitrogen color is measured.

TABLE 1

| | Exposure Time of Powdered Samples (Weeks) | | | | |
|---|---|---|---|---|---|
| | 0 | 2 | 4 | 6 | 8 |
| Sample from Example 1 | | | | | |
| Wt. increase, % | — | .10 | .22 | .30 | .40 |
| Color (Gardner 1963) | 7+ | 10+ | 11 | 11+ | |
| Sample of Commercial Ester | | | | | |
| Wt. increase, % | — | .25 | .55 | .87 | 1.14 |
| Color | 10+ | 11+ | 12+ | 13+ | |

EXAMPLE 2

Acintol ® R type S tall oil rosin, as received, is disproportionated by heating the rosin, adding 0.14 wt percent of Vultac 2 catalyst at 220° C. The heating is continued to 285° C. at which temperature the mixture is held for 6 hours. During this period the reactor is sparged with steam at a rate of 0.3% per hour. The disproportionated rosin is cooled to 235° C. and 0.025 wt. % of 75% $H_3PO_4$ is added. Glycerine (1.3 equivalents) equivalent of rosin is added gradually over a period of four hours. The temperature is raised to 245° and held until the desired acid number is reached. At acid number about 25 a 200 mm Hg vacuum is applied. At acid number 8, a steam strip is commenced and vacuum is set at 100 mm Hg and the strip is continued for two hours. The product has a ring and ball softening point of 80° C., acid number 6.2, Color X and abietic moiety content of 3.6 percent.

EXAMPLE 3

A 500 gallon kettle was charged with 2,834 lbs of "S" rosin heated to about 170° C., 330 lbs glycerine and 14.1 lbs of Vultac 2. The charge was put under nitrogen and heated to 220° C. where the temperature was held for two hours. For the remainder of the reaction the temperature was raised to 260° C. and held there. Two charges, each 2.8 lbs of Vultac 2, were added at four hours and eight hours after the temperature was raised to 260° C. When acid number reached 10, the charge was vacuum steam stripped at 275° C., and 60 mm Hg vacuum for four hours.

The finished product had an 82° C. softening point, 6.2 acid number, X-color, abietic acid content 7.1 wt %.

EXAMPLE 4

The ester products of Examples 2 and 3 were used as tackifiers in a proprietary adhesive formulation based on styrene-butadiene rubber. Formulations using each ester were made from the freshly prepared esters and from esters which had been aged by storing the powdered ester solids (passed through a 40 mesh sieve) in open dishes in air atmosphere maintained at 22° C., 50% relative humidity for periods from two to twelve weeks. Formulations were also made using fresh and aged tackifiers consisting of the glycerol ester of unmodified rosin. Samples from each formulation were tested for adhesive properties by the following conventional tests.

Tack, inches
180° Peel, oz/in
Quick Stick, oz/in
Shear, minutes (Angle, 178°; weight, 500 gm)
Probe Tack, grams.

The test results are tabulated in Table 2.

TABLE 2

Properties of SYNPOL 1011A Tackified by Rosin Esters

| Ester | phr | Weeks ester was exposed to air[1] | | | | | | |
|---|---|---|---|---|---|---|---|---|
| | | 0 | 2 | 4 | 6 | 8 | 10 | 12 |
| *Tack Inches* | | | | | | | | |
| Example 3 | 90 | 1 | 3 | 2 | 3 | 3 | 4 | T |
| | 105 | 1 | 1 | 1 | 2 | 2 | 5 | T |
| Example 2 | 90 | 3 | 2 | 3 | 3 | 3 | 4 | 2 |
| | 105 | 3 | 4 | 4 | 2 | 2 | 7 | 2 |
| Unmodified | 90 | 1 | 1 | T− | NT | — | — | — |
| Rosin Ester | 105 | 1 | 2 | T− | NT | — | — | — |
| *180° Peel, oz./in exposed* | | | | | | | | |
| Example 3 | 90 | 95 | 55 | 97 | 100 | 100 | 90 | 75 |
| | 105 | 100 | 100 | 100 | 90 | 100 | 90 | 95 |
| Example 2 | 90 | 69 | 80 | 80 | 65 | 85 | 65 | 80 |
| | 105 | 75 | 80 | 75 | 70 | 75 | 80 | 90 |
| Unmodified | 90 | 100 | 100 | 135 | — | — | — | — |
| Rosin Ester | 105 | 90 | 105 | 105 | — | — | — | — |
| *Quick Stick, oz./in* | | | | | | | | |
| Example 3 | 90 | 30 | 20 | 32 | 30 | 30 | 35 | 20 |
| | 105 | 36 | 40 | 41 | 35 | 40 | 50 | 30 |
| Example 2 | 90 | 19 | 20 | 25 | 21 | 20 | 25 | 25 |
| | 105 | 25 | 27 | 39 | 30 | 30 | 35 | 30 |
| Unmodified | 90 | 30 | 30 | 10 | — | — | — | — |
| Rosin Ester | 105 | 37 | 40 | 5 | — | — | — | — |
| *Shear[2], minutes* | | | | | | | | |
| Example 3 | 90 | 1100 | 1000 | 975 | 800 | 1050 | 1100 | 1000 |
| | 105 | 1000 | 600 | 750 | 800 | 900 | 900 | 800 |
| Example 2 | 90 | 2200 | 700 | 900 | 850 | 1100 | 1100 | 850 |
| | 105 | 1900 | 600 | 700 | 600 | 700 | 700 | 700 |
| Unmodified | 90 | 1000 | 900 | 950 | — | — | — | — |
| Rosin Ester | 105 | 800 | 650 | 700 | — | — | — | — |
| *Probe Tack, grams* | | | | | | | | |
| Example 3 | 90 | — | 400 | 600 | 550 | 550 | 500 | 85 |
| | 105 | — | 675 | 650 | 650 | 650 | 550 | 100 |
| Example 2 | 90 | — | 375 | 425 | 400 | 475 | 400 | 450 |
| | 105 | — | 550 | 475 | 500 | 575 | 500 | 500 |
| Unmodified | 90 | — | 550 | 0 | — | — | — | — |
| Rosin Ester | 105 | — | 700 | 0 | — | 13 | — | — |

[1]Powdered resin passed through a No.40 Tyler sieve (Tyler equivalent of 35 mesh) and stored in an open dish at 22° and 50% RH.
[2]Shear: Angle, 178°; weight, 500 grams.
T = greater than 11 inches, tacky to touch;
T− = greater than 11 inches, slightly tacky to touch;
NT = no tack;
phr = parts of tackifier used per 100 parts of rubber.

In preparing adhesive compositions using the modified rosin ester products as tackifiers for styrene butadiene rubber, the ester of modified rosin is found to have retained its tackifying ability for a much longer time before use, due to significantly reduced oxidation rate, as compared with a tackifier consisting of the glycerol ester of the unmodified rosin.

The modified rosin ester can be made by starting with a previously prepared disproportionated rosin which is then simply esterified with glycerol in presence of a catalyst, as in Example 2. This product does not have significantly different properties from the modified esters described above.

Wood or gum rosins can also be used to make the improved product. These rosins can be disproportionated in the described manner to reduce abietic content to about 10% or less, preferably about 2%, using any suitable disproportionating agent for the purpose.

The preferred catalyst for esterification is phosphoric acid and it is used in catalytic amounts, usually less than one percent of the rosin weight. We prefer to use a concentrated $H_3PO_4$ catalyst.

Adhesive compositions made with the modified rosin ester tackifiers of this invention have properties that are not significantly different from those of an adhesive made with glycerol esters of unmodified rosin, when both of the tackifiers have been freshly prepared before blending the adhesive formulation. On aging of the tackifiers before use, however, the adhesives made with aged samples of the modified rosin ester show drastically better adhesive properties, particularly with regard to the tack and quick stick properties, than those made with aged samples of the glycerol ester of unmodified rosin.

We claim:

1. A method of making a glycerol ester of modified rosin, wherein unmodified rosin is simultaneously disproportionated and esterified in presence of a disproportionating agent and glycerol and an esterification catalyst at a temperature sufficient for both reactions and for a time sufficient to reduce the abietic acid content to about 5% or less and to essentially complete the esterification.

2. A method defined by claim 1 wherein the disproportionating agent is a polysulfide of p-t-amyl phenol.

3. A method defined by claim 1 wherein the esterification catalyst is phosphoric acid.

* * * * *